US012729000B2

(12) United States Patent
Van Schaik

(10) Patent No.: US 12,729,000 B2
(45) Date of Patent: Sep. 8, 2026

(54) DEVICE FOR TRANSMITTING A MOVEMENT

(71) Applicant: SAFRAN ELECTRONICS & DEFENSE, Paris (FR)

(72) Inventor: Jeroen Robbert Van Schaik, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 120 days.

(21) Appl. No.: 18/832,989

(22) PCT Filed: Jan. 19, 2023

(86) PCT No.: PCT/FR2023/050076
§ 371 (c)(1),
(2) Date: Jul. 25, 2024

(87) PCT Pub. No.: WO2023/144483
PCT Pub. Date: Aug. 3, 2023

(65) Prior Publication Data

US 2025/0108921 A1 Apr. 3, 2025

(30) Foreign Application Priority Data

Jan. 28, 2022 (FR) ...................................... 2200786

(51) Int. Cl.
*B64D 11/06* (2006.01)
*F16H 25/22* (2006.01)

(52) U.S. Cl.
CPC ..... *B64D 11/0639* (2014.12); *F16H 25/2209* (2013.01)

(58) Field of Classification Search
CPC ........... B64D 11/0639; B60N 2/42736; F16H 25/2209
(Continued)

(56) References Cited

U.S. PATENT DOCUMENTS 5,316,393 A * 5/1994 Daugherty ............ F16C 19/542 384/517
5,651,616 A * 7/1997 Hustak .................... F16C 27/02 384/119
(Continued)

FOREIGN PATENT DOCUMENTS

| | | | | |
|---|---|---|---|---|
| FR | 3103859 A1 | 6/2021 | | |
| FR | 3136450 A1 * | 12/2023 | ........... | B64D 11/064 |
| WO | 2021099737 A1 | 5/2021 | | |

OTHER PUBLICATIONS

International Search Report in corresponding PCT Application No. PCT/FR2023/050076, mailed Mar. 15, 2023, 2 pages, English Translation Only.

*Primary Examiner* — Jose V Chen
(74) *Attorney, Agent, or Firm* — Cozen O'Connor

(57) ABSTRACT

A transmission device for transmitting a movement includes a screw extending along an axis, a nut, a housing, a first elastic member, a second elastic member, —a first assembly, a second assembly, a first axial stop, and a second axial stop. The first elastic member is able to be deformed independently of the second elastic member under the effect of a first axial force, and the second elastic member is able to be deformed independently of the first elastic member under the effect of a second axial force which exceeds a second threshold.

12 Claims, 5 Drawing Sheets

(58) Field of Classification Search
USPC .................................................... 297/216.16
See application file for complete search history.

(56) References Cited

U.S. PATENT DOCUMENTS

| | | | | |
|---|---|---|---|---|
| 8,714,642 | B2 * | 5/2014 | Lamparter | B60N 2/24 297/216.16 |
| 10,787,195 | B2 | 9/2020 | Asakura et al. | |
| 2002/0017154 | A1 * | 2/2002 | Blaurock | F16H 25/2209 74/89.42 |
| 2012/0199777 | A1 * | 8/2012 | Schlarman | F16K 1/224 384/454 |
| 2020/0332870 | A1 * | 10/2020 | Iinuma | F16H 25/2209 |
| 2020/0355194 | A1 * | 11/2020 | Sishtla | F04D 27/0246 |
| 2022/0340284 | A1 * | 10/2022 | Koustubhan | B64D 11/0648 |
| 2024/0337311 | A1 * | 10/2024 | Pettersen | F16H 25/20 |

* cited by examiner

DEVICE FOR TRANSMITTING A MOVEMENT

CROSS-REFERENCE TO RELATED APPLICATIONS

This application is a US National phase Application of PCT/FR2023/050076 filed Jan. 19, 2023, which claims priority to French Patent Application No. 2200786 filed Jan. 28, 2022, both of which are hereby incorporated in their entirety.

TECHNICAL FIELD

This disclosure relates to a device for transmitting a movement and a seat comprising said device.

BACKGROUND

In the field of passenger transport, particularly air transport, it is known to equip aircraft with seats which allow passengers to be transported in a seated position. Each seat comprises a plurality of elements, for example a backrest, a seating portion, a headrest, one or more armrests, etc.

To improve passenger comfort, each seat may be equipped with one or more drive systems enabling movement of the seat relative to the floor on which it is installed, or movement of various elements of the seat relative to others.

Generally, the drive system includes an actuator and a transmission chain. The mechanical parts which constitute the drive system must be capable of supporting crash-type loads which occur, for example, during an emergency landing of the aircraft. The mechanical parts must also be capable of supporting the loads that occur when movement of the seat suddenly stops or when a passenger drops abruptly onto the seat. All these loads are associated with a significant axial force applied to the parts of the drive system, which results in wear or even breakage.

Conventionally, in order to limit the risks of wear and breakage, the mechanical parts of the drive system are overdesigned. However, this overdesign increases both the manufacturing cost of the drive system and the weight of the aircraft.

It is also known to provide the seat with a brake which, based on a phenomenon of friction between several parts of the brake, allows stopping the actuator in the event of a load with significant axial force. However, the brakes used currently are one-way brakes, meaning brakes which can only absorb loads applied in one direction. This means that the parts of the drive system are not protected when the seat rebounds during application of a load with high axial force. Two variants of the one-way brake must be implemented so that the brake is operational regardless of the direction in which it is intended to be installed in the seat. Therefore the costs of designing and manufacturing the brake are increased.

SUMMARY

This disclosure improves the situation.

For this purpose, a transmission device for transmitting a movement is proposed, the device comprising:

- a screw extending along an axis;
- a nut cooperating with the screw;
- a housing;
- a first elastic member;

- a second elastic member;
- a first assembly comprising said nut;
- a second assembly comprising said housing;
- a first axial stop which is axially integral with the first assembly and able to cooperate with a first complementary axial stop of the second assembly, a first axial clearance being formed between the first axial stop and the first complementary axial stop; and
- a second axial stop which is axially integral with the first assembly and able to cooperate with a second complementary axial stop of the second assembly, a second axial clearance being formed between the second axial stop and the second complementary axial stop;
- the first elastic member being able to be deformed independently of the second elastic member under the effect of a first axial force oriented in a first direction and applied by the first assembly on the first elastic member, so as to reduce the first axial clearance, the first axial stop being able to come to bear against the first complementary axial stop when said first axial force exceeds a first threshold,
- the second elastic member being able to be deformed independently of the first elastic member under the effect of a second axial force oriented in a second direction opposite to the first direction and applied by the first assembly on the second elastic member, so as to reduce the second axial clearance, the second axial stop being able to come to bear against the second complementary axial stop when said second axial force exceeds a second threshold.

In the present text, the terms “axial”, “radial”, and “circumferential” are defined in relation to the axis of extension of the screw. In particular, “axial” means along the axis of extension of the screw or parallel to it, and radial means along any axis transverse or substantially transverse to that axis. “Circumferential” is understood to mean around the aforementioned axis.

In the proposed device, by means of the deformation of the first elastic member or second elastic member which causes the first assembly to bear against the second assembly, the axial forces are dissipated through the second assembly, in particular through the housing, instead of through the other parts of the device which are more subject to wear and fracture. Therefore the risks of wear and fracture of the device are reduced, without it being necessary to overdesign the parts of said device.

Furthermore, the presence of the first elastic member and second elastic member, which are able to be deformed independently of one another under the effect of axial forces oriented in opposite directions, allows the transmission device to constitute a two-way brake capable of absorbing the axial forces undergone, even in the event of seat rebound, and independently of the direction of installation in the seat of the transmission device.

The first elastic member and the second elastic member may be elastic washers.

The first threshold and the second threshold correspond for example to the maximum axial force which respectively can be applied to the first elastic member and the second elastic member without them being deformed. Preferably, the first threshold and the second threshold are between 3000 N and 6000 N, more preferably between 3325 N and 5556 N. For example, the first and second thresholds are equal to 4440 N. Any axial force, oriented in the first direction and applied by the first assembly on the first elastic member, which exceeds the first threshold may be associated with a crash-type load or with significant axial force applied to the device in the first direction. Similarly, any axial force, oriented in the second direction and applied by the first assembly on the second elastic member, which exceeds the second threshold may be associated with a crash-type load or with significant axial force applied to the device in the second direction.

The screw, the housing, and the nut may be coaxial.

The housing and nut may comprise a bore. The screw may thus be partially accommodated inside the housing and nut.

The first assembly may be configured to rotate about the axis of extension of the screw when the proposed device transmits a movement. In the event of a crash-type load or a load of significant axial force applied to the device, the first assembly may also move axially in the direction of application of the load. This axial movement of the first assembly generates the axial forces, in the first direction or second direction, that the first assembly exerts on the first elastic member or on the second elastic member.

The second assembly may be configured to be immobile when the proposed device transmits a movement as well as during application of crash-type loads or loads of significant axial force.

When the first assembly comes to bear against the second assembly, the axial movement of the first assembly may be blocked. Furthermore, friction appears between the first stop and the first complementary stop, or between the second stop and the second complementary stop. This friction may slow down the rotational movement of the first assembly.

The screw and the nut form a screw-nut system which is preferably reversible. “Reversible” is understood to mean that rotation of the nut around the axis of extension of the screw causes axial movement of the screw.

The nut and the screw may respectively comprise complementary tapping and threading shaped so that rotation of the nut around the axis of the screw causes axial movement of the screw. The tapping of the nut and the threading of the screw may engage directly or indirectly with each other.

In certain cases, so that the transmission device activates when the axial force applied on the device is greater than the first or second threshold, rotation of the nut is blocked with sufficient torque. For this purpose, the nut may be connected to an element which allows braking it. For example, the nut may be connected to a friction brake or a motor with high detent torque.

The device may further comprise a first preloading element and a second preloading element, the first preloading element being able to adjust a preloading stress acting on the first elastic member independently of a preloading stress acting on the second elastic member, the second preloading element being able to adjust the preloading stress acting on the second elastic member independently of the preloading stress acting on the first elastic member.

The first preloading element and the second preloading element therefore make it possible to adjust, independently, the preloading stress which acts on the first elastic member and on the second elastic member respectively. Thus, the preloading stresses acting on the first and second elastic members may be different so that they do not cancel each other out. The transmission device therefore constitutes an operational two-way brake.

The first preloading element and the second preloading element may be installed in the bore of the housing. For example, the first preloading element and the second preloading element may each have a radially outer periphery connected to the second assembly and a free radially inner periphery arranged facing the first assembly. Radial clearance may thus be formed between the first assembly and the first and second preloading elements. This prevents the first and second preloading elements from moving along with the first assembly in rotation about the axis of extension of the screw.

To connect the first and second preloading elements to the housing, the radially outer periphery of each of the preloading elements may comprise a thread complementary to a respective tapping arranged in the housing. This configuration also allows the first and second preloading elements to move axially in order to adjust the preloading stress which acts on each elastic member. For example, the first preloading element may be moved axially closer to the first elastic member by screwing its thread into the respective tapping of the housing so as to increase the preloading stress in the first elastic member. Similarly, the first element may be moved further away axially from the first elastic member by unscrewing its thread in the respective tapping of the housing so as to reduce the preloading stress in the first elastic member. The same principle may be applied to the second preloading element in order to increase or decrease the preloading stress in the second elastic member.

Note that the axial movements of the first and second preloading elements are independent of each other, which makes it possible to apply a different preloading stress to each elastic member.

We clarify that the terms “external” or “outer” and “internal” or “inner” in the present text are understood to mean radially.

The device may comprise at least one bearing which comprises a radially inner ring arranged facing the first assembly and a radially outer ring arranged facing the second assembly, a radially outer periphery of each elastic member coming to bear axially, directly or indirectly, against the radially outer ring of said bearing, and a radially inner periphery coming to bear axially against the preloading element.

The first elastic member bears axially against the radially outer ring of the at least one bearing on a side of the at least one bearing that is axially opposite the side of the at least one bearing where the second elastic member bears axially against said radially outer ring.

The axial force applied by the first assembly on each of the elastic members may pass through at least one bearing. In particular, the axial force may be transmitted from the first assembly to the radially inner ring of the at least one bearing, which causes axial movement of the radially outer ring in the direction of this axial force. Because each elastic member bears axially, directly or indirectly, against the radially outer ring of said bearing, the axial movement of the radially outer ring causes deformation of the elastic member on which the axial force is applied.

The second assembly may comprise a shoulder extending radially from a radially inner wall of the housing. The first elastic member may then be arranged on a first side of the shoulder of the second assembly, and the second elastic member may be arranged on a second side of the shoulder of the second assembly that is opposite to the first side.

As the first elastic member and the second elastic member are arranged on opposite sides of the shoulder of the second assembly, it is possible to obtain a differentiated force path for the axial forces applied in the first direction and for the axial forces applied in the second direction.

The shoulder of the second assembly may be annular.

A first bearing may be arranged between the first elastic member and the first side of the shoulder of the second assembly. A second bearing may be arranged between the second elastic member and the second side of the shoulder of the second assembly. The radially outer periphery of the first elastic member then comes to bear axially against the radially outer ring of the first bearing, the radially outer periphery of the second elastic member coming to bear axially against the radially outer ring of the second bearing. Each elastic member thus comes to bear against the outer ring of a different bearing, which increases the independence between the forces undergone by each of the elastic members.

The first assembly may comprise a shoulder extending radially from a radially outer wall of the first assembly, the shoulder of the first assembly being arranged radially facing the shoulder of the second assembly.

The shoulder of the first assembly allows better separation of the force path for the axial forces applied in the first direction and for the axial forces applied in the second direction.

The shoulder of the first assembly may have a length in the axial direction that is shorter than the length in said axial direction of the shoulder of the second assembly. The preload of the first and second elastic members is thus adjustable independently on the two sides of the shoulders of the first and second assemblies.

A bearing may be arranged radially inside the shoulder of the second assembly.

The bearing may have an axial length substantially equal to an axial length of the shoulder of the second assembly. The bearing may be a double-row bearing, which can absorb more axial load. Safety may thus be improved in the event of a crash-type load or any load with significant axial force.

The bearing may be held in position on the shoulder of the second assembly with a first annular spacer and a second annular spacer projecting radially from the first assembly and arranged axially one on either side of the radially inner ring of the bearing.

The device may further comprise a first annular support plate arranged between the radially outer ring of the bearing and the radially outer periphery of the first elastic member, and a second annular support plate arranged between the radially outer ring of the bearing and the radially outer periphery of the second elastic member, the radially outer periphery of the first elastic member coming to bear against the first support plate, the radially outer periphery of the second elastic member coming to bear against the second support plate.

The first plate and the second plate may be annular. An axial half-section of the first and second plates preferably has an inverted L shape.

The first support plate and the second support plate may be free to move relative to the first assembly and second assembly. In this case, the first and second support plates may be wedged axially between the radially outer ring of the bearing and the radially outer periphery of the first elastic member and second elastic member respectively. They may thus be held in position while being able to be moved integrally with the radially outer ring of the bearing, which makes it possible to deform the first elastic member or the second elastic member when the axial force applied by the first assembly is greater than the first threshold or second threshold.

The first support plate may be radially facing the first spacer. The second support plate may be radially facing the second spacer.

According to another aspect, a seat for an aircraft is proposed, comprising a fixed part intended to be fixed to a fixed part of the aircraft and a movable part able to be moved relative to the fixed part, a transmission device for transmitting movement as described above being mounted between the movable part and the fixed part, the nut of the transmission device for transmitting movement being able to be rotated by an actuator, the screw being connected to said movable part of the seat, the housing being connected to said fixed part of the seat.

The transmission device for transmitting movement imparts a movement to the movable part of the seat which causes the movable part to move relative to the fixed part of said seat. In particular, because the screw of the transmission device is connected to the movable part of the seat, the movement of this movable part is integral with the axial movement of the screw.

The fixed part of the seat may be connected directly or indirectly to the fixed part of the aircraft. The fixed part of the aircraft corresponds, for example, to the floor.

In certain cases, the fixed and movable parts of the seat each corresponds to one of the elements of the seat. In one non-limiting example, the movable part corresponds to the seat back, while the fixed part of the seat corresponds to the seating portion, which is connected directly or by means of feet to the floor of the aircraft.

Note that it is not excluded that the element of the seat which constitutes its fixed part in one given situation constitutes the movable part of the seat in another situation. For example, the seat which is connected to the floor by means of feet could move relative to the feet, the feet being included in the fixed part of the seat, and the seating portion being part of the movable part of the seat. Similarly, the element of the seat which constitutes its movable part in a given situation may constitute the fixed part of the seat in another situation.

According to another non-limiting example, the fixed part of the seat comprises for example a slide fixed to the floor of the aircraft. The movable part of the seat comprises for example several feet connected to the slide so as to be able to slide along it.

BRIEF DESCRIPTION OF DRAWINGS

Other features, details and advantages will become apparent upon reading the detailed description below, and upon analyzing the attached drawings, in which.

DETAILED DESCRIPTION

Figure 1:
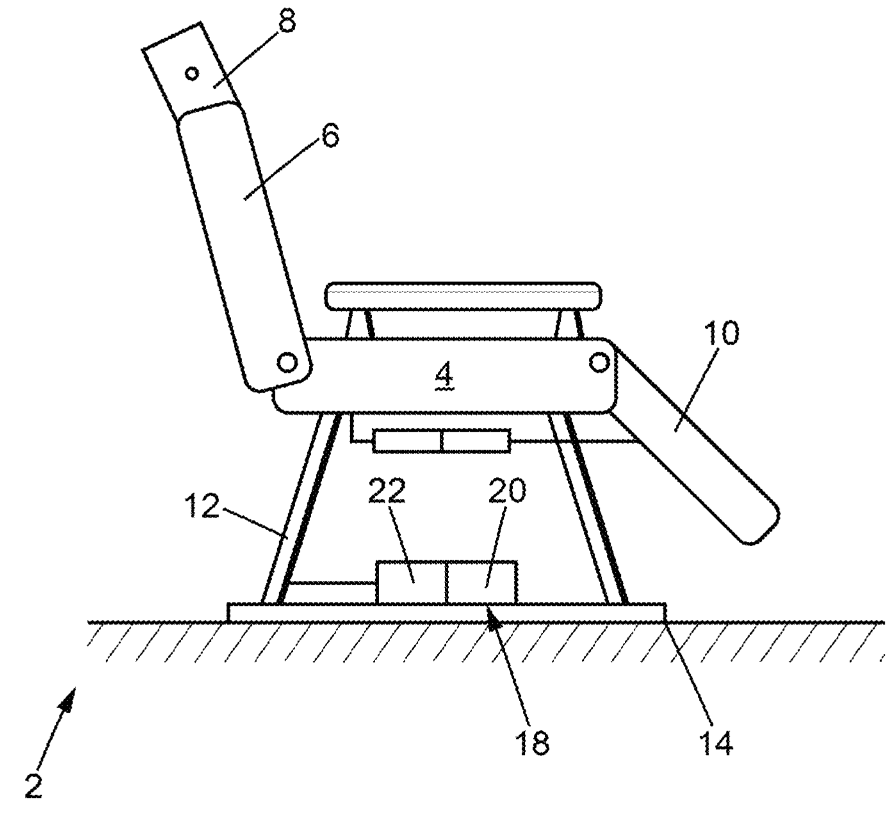
FIG. 1 shows a schematic side view of an aircraft seat provided with a transmission device for transmitting a movement according to an embodiment.

FIG. 1 shows a seat 2, in particular for an aircraft. Seat 2 comprises a seating portion 4, a backrest 6, and a headrest 8. Seat 2 may also comprise a leg rest 10.

Seat 2 is intended to be connected to a fixed part of the aircraft, in particular to the floor. For this purpose, seat 2 comprises feet 12 and a slide 14. Slide 14 comprises for example two rails fixed to the ground, each foot 12 being mounted on one of the rails so as to be able to slide along the respective rail. Seat 2 is thus able to move forward or backward.

Seat 2 includes an electric drive system 18. System 18 may be dedicated to moving one of the elements (seating portion 4, backrest 6, headrest 8, leg rest 10, etc.) of seat 2 relative to the others. Alternatively, system 18 is dedicated to moving seat 2 in slide 14.

In the following, the element of seat 2 which is moved is called "movable part", while the elements which it moves relative to are called "fixed part".

Drive system 18 comprises for example an actuator 20 able to generate movement, in particular rotation, and a transmission device 22 for transmitting a movement. In particular, the transmission device is configured to convert the movement generated by the actuator into a movement adapted to move the movable part relative to the fixed part of the seat.

Drive system 18 further comprises mechanical parts (not shown), such as gears or connecting rods, adapted to transmit the movement generated by actuator 20 to transmission device 22. More precisely, these mechanical parts connect actuator 20 to transmission device 22. Such mechanical parts preferably form part of a reduction gear, for example a multi-stage reduction gear. The reduction gear makes it possible to reduce the speed of the movement generated by actuator 20 before being transmitted to transmission device 22. The reduction in the speed of the movement generated by actuator 20 is linked to an increase in the torque output by actuator 20.

Transmission device 22 will now be described with reference to FIGS. 2 to 5.

Figure 2:
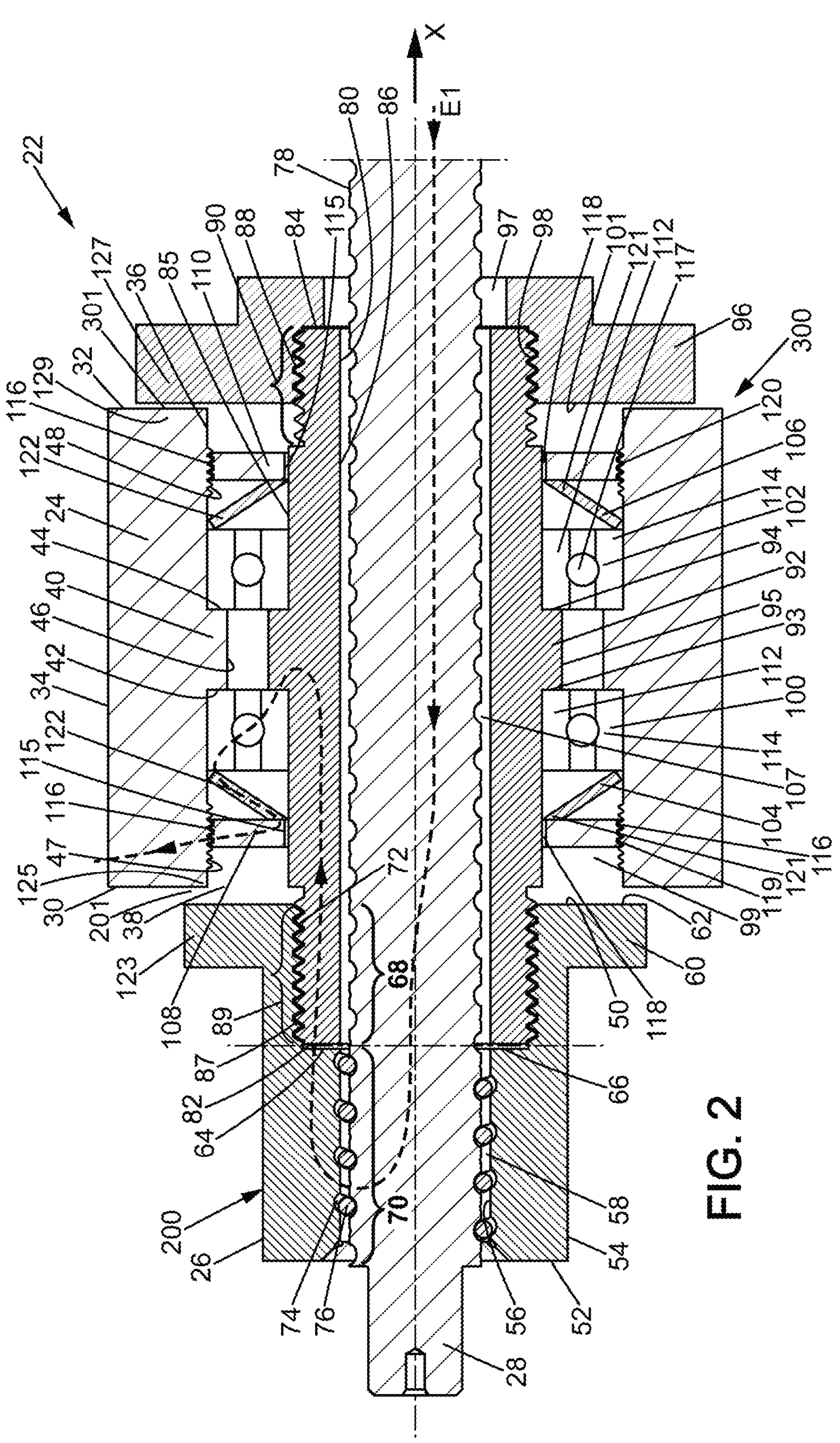
FIG. 2 shows a schematic view in axial section of the transmission device for transmitting a movement of the seat of FIG. 1 according to one embodiment, and a force path followed by this transmission device when an axial force according to a first direction is applied to the transmission device.
Figure 3:
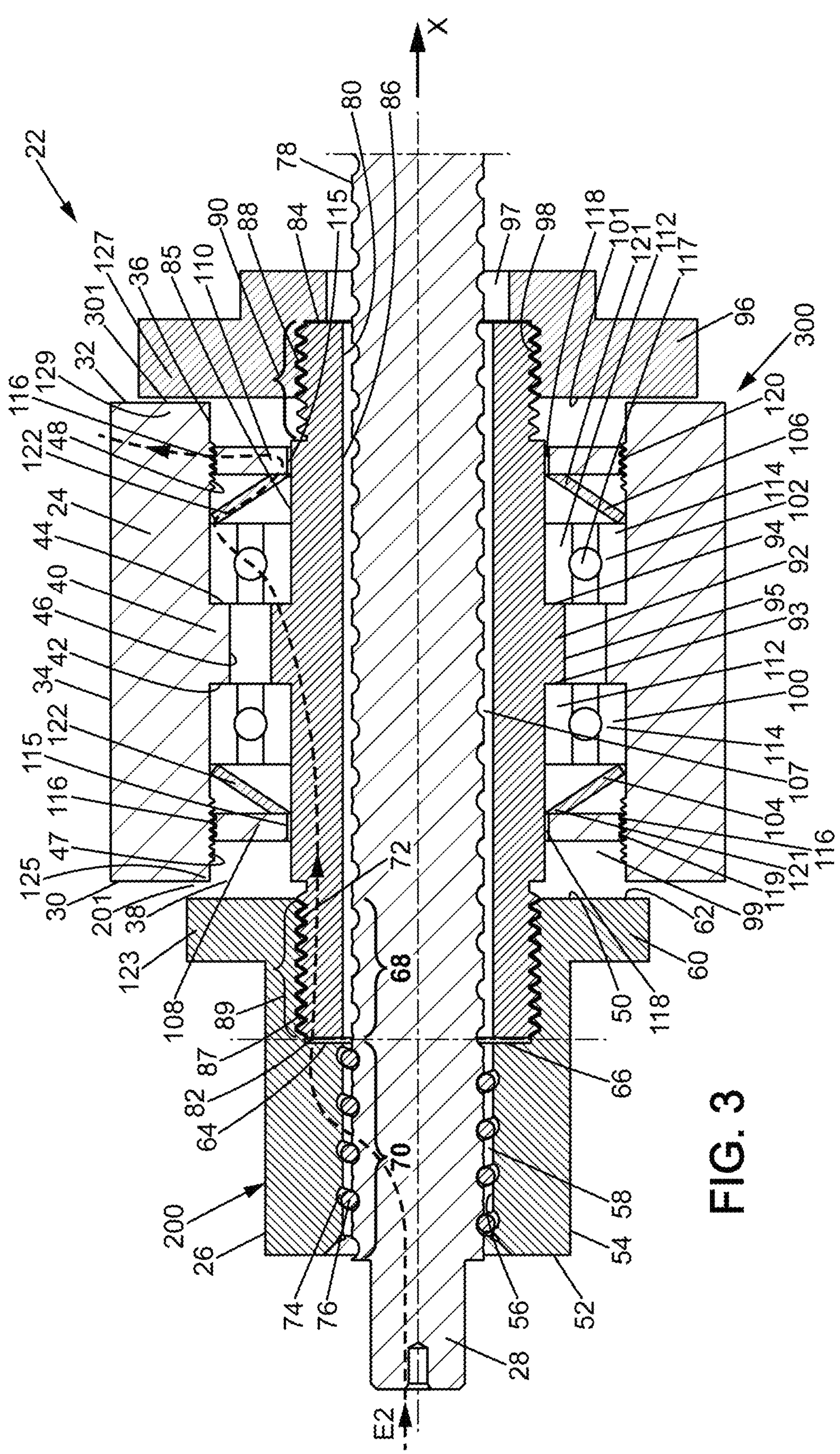
FIG. 3 shows the same view of the transmission device for transmitting a movement of FIG. 2, and a force path followed by this transmission device when an axial force in a second direction opposite to the first direction is applied to the transmission device.

In a first embodiment, illustrated in FIGS. 2 and 3, device 22 comprises a housing 24, a nut 26, and a screw 28 which extends along an axis X.

Housing 24 has a generally cylindrical shape extending axially between a first end 30 and a second end 32. Housing 24 comprises a radially outer wall 34 and a radially inner wall 36. Radially inner wall 36 defines a bore 38 which passes axially through housing 24 between first and second ends 30, 32. Bore 38 preferably has a substantially circular transverse cross-section along its entire length. In this text, "transverse" means comprised within a plane substantially normal to the X axis.

Housing 24 comprises a shoulder 40, preferably annular, extending radially from radially inner wall 36. In particular, shoulder 40 comprises a first face 42 and a second face 44 which are substantially parallel and which project radially into bore 38. Shoulder 40 further comprises a connecting face 46 extending axially within bore 38. Connecting face 46 connects first and second faces 42, 44 of shoulder 40.

The distance in the axial direction between first and second faces 42, 44 defines the width of shoulder 40.

Radially inner wall 36 of housing 24 is advantageously provided with a first tapping 47 and a second tapping 48. First tapping 47 is arranged between first end 30 of housing 24 and first face 42 of shoulder 40. Second tapping 48 is arranged between second end 32 of housing 24 and second face 44 of shoulder 40. Advantageously, tappings 47, 48 are identical, but this is not limiting.

As will be detailed below, first tapping 47 allows connecting a first preloading element 108 to housing 24, while second tapping 48 allows connecting a second preloading element 110 to housing 24.

Radially inner wall 36 may further comprise a first axial stop and a second axial stop, these not being shown in FIGS. 2 and 3. The first and second axial stops of wall 36 respectively block axial movement of first preloading element 108 and second preloading element 110, as will be described below.

As will also be detailed, housing 24 is configured to be immobile in device 22. Advantageously, when device 22 is installed in seat 2, housing 24 is connected to a fixed part of seat 2.

Nut 26 has a generally cylindrical shape extending axially between a first end 50 and a second end 52. Nut 26 comprises a radially outer wall 54 and a radially inner wall 56.

Radially outer wall 54 comprises an annular flange 60 projecting radially outwards. One face 62 of flange 60 is aligned axially with first end 50 of nut 26. Advantageously, the diameter of flange 60 is greater than the diameter of bore 38 of housing 24.

Radially inner wall 56 defines a bore 58 passing axially through nut 26 between first and second ends 50, 52. Preferably, a transverse cross-section of bore 58 is substantially circular along its entire length.

A shoulder 64, preferably annular, is provided on radially inner wall 56. Shoulder 64 comprises a face 66 extending radially within bore 58. A vector normal to face 66 is oriented towards first end 50 of nut 26.

Shoulder 64 divides radially inner wall 56 into a first zone 68 and a second zone 70. First zone 68 extends between shoulder 64 and first end 50 of nut 26. Second zone 70 extends between shoulder 64 and second end 52 of nut 26. As can be seen from FIGS. 2 and 3, the diameter of bore 58 along first zone 68 is greater than the diameter of bore 58 along second zone 70, but is shorter than the diameter of bore 38 of the housing.

First zone 68 of radially inner wall 56 comprises a tapping 72. Tapping 72 allows connecting nut 26 to a sleeve 80 which will be described below. Advantageously, tapping 72 is designed so that nut 26 and sleeve 80 move together when they are connected, as will be detailed below.

Second zone 70 of radially inner wall 56 comprises a tapping 74 intended to engage directly or indirectly with screw 28. In FIGS. 2 and 3, tapping 74 engages with screw 28 via a plurality of balls 76, but it could engage with screw 28 via a plurality of rollers, among other possibilities. Alternatively, tapping 74 may be trapezoidal and engage directly with screw 28. Tapping 74 is designed to cause axial movement of screw 28 when nut 26 rotates about the X axis.

Advantageously, nut 26 is connected to the reduction gear of drive system 18. The rotational movement generated by actuator 20 is thus transmitted, with a reduced speed and an increased torque, to nut 26. Nut 26 is thus rotated about the X axis.

As can be seen in FIGS. 2 and 3, screw 28 is partially housed in bore 38 of the housing and in bore 58 of nut 26.

A radially outer surface of screw 28 comprises a thread 78 shaped to engage directly or indirectly with tapping 74 of nut 26 as described above. Screw 28 may therefore be a ball screw, a roller screw, or a trapezoidal screw, among other possibilities. This allows screw 28 and nut 26 to cooperate so that rotation of nut 26 around the X axis causes axial movement of screw 28.

When device 22 is installed in seat 2, screw 28 is preferably connected, directly or indirectly, to the movable part of seat 2. The movable part thus is moved relative to the fixed part of seat 2, integrally with screw 28. When the movable part corresponds to feet 12, and the fixed part of the seat 2 corresponds to slide 12, device 22 allows moving seat 2 forward and backward.

As indicated above, device 22 further comprises a sleeve 80. Sleeve 80 has a substantially cylindrical shape extending axially between a first end 82 and a second end 84. Sleeve 80 comprises a radially outer wall 85 and a radially inner wall 86.

Radially outer wall 85 of sleeve 80 comprises a first thread 87 and a second thread 88.

First thread 87 extends axially over a first end portion 89 of sleeve 80 which comprises first end 82. First thread 87 is complementary to tapping 72 of nut 26, which allows connecting nut 26 and sleeve 80.

Second thread 88 extends axially over a second end portion 90 of sleeve 80 which comprises second end 84. Second thread 88 allows connecting sleeve 80 to a closing nut 96 which will be described below.

Radially outer wall 85 further comprises a shoulder 92, preferably annular, extending radially from radially outer wall 85. In particular, shoulder 92 comprises a first face 93 and a second face 94 which are substantially parallel and which project radially outwards from sleeve 80. Shoulder 92 further comprises a connecting face 95 extending axially and connecting first and second faces 93, 94 of shoulder 92.

The distance in the axial direction between first and second faces 93, 94 defines the width of shoulder 92. Preferably, the width of shoulder 92 is shorter than the width of shoulder 40 of housing 24.

Radially inner wall 86 defines a bore 107 traversing sleeve 80 between first and second ends 82, 84. Advantageously, bore 107 has a substantially circular transverse cross-section. As can be seen in FIGS. 2 and 3, the diameter of bore 107 is preferably substantially equal to the diameter of bore 58 of nut 26 along second zone 70 of radially inner wall 56. This makes it possible for bores 58 and 107 to lie in the extension of one another when nut 26 and sleeve 80 are connected.

Closing nut 96 has a generally annular shape comprising a central hole 97. The diameter of central hole 97 is preferably greater than or equal to the diameter of bore 107 of sleeve 80. Closing nut 97 comprises a closing face 101 oriented axially towards nut 26. Advantageously, the radially outer diameter of closing face 101 is greater than the diameter of bore 38 of housing 24.

A radially inner edge of closing nut 96 comprises a tapping 98. Tapping 98 is complementary to second thread 88 of sleeve 80, which allows connecting closing nut 96 and sleeve 80. Tapping 98 and thread 88 are designed so that sleeve 80 and closing nut 96 move integrally together when connected. Because sleeve 80 is moved integrally with nut 26, closing nut 96 is also moved integrally with nut 26.

As can be seen in FIGS. 2 and 3, sleeve 80 is shaped to extend axially inside bore 38 of housing 24. In particular, sleeve 80 is arranged radially between screw 28 and radially inner wall 36 of housing 24. In this position, housing 24 and sleeve 80 are coaxial. Advantageously, shoulder 92 of the sleeve and shoulder 40 of the housing are arranged radially facing each other when sleeve 80 is installed inside bore 38 of the housing.

A circumferential cavity 99 is formed between the radially outer wall of sleeve 80 and the radially inner wall of housing 24. Cavity 99 has a substantially constant thickness with a narrowing in the zone where shoulders 40, 92 are radially facing each other.

Transmission device 22 further comprises a first bearing 100, a second bearing 102, a first elastic member 104, a second elastic member 106, and first and second preloading elements 108, 110. Bearings 100, 102, elastic members 104, 106, and preloading elements 108, 110 are arranged within cavity 99.

First and second bearings 100, 102 each comprise a radially inner ring 112 and a radially outer ring 114. A plurality of rolling elements 117 are arranged circumferentially between rings 112 and 114. In FIGS. 2 and 3, bearings 100, 102 comprise a single circumferential row of rolling elements 117.

Radially inner ring 112 is arranged radially facing sleeve 80, while radially outer ring 114 is arranged radially facing housing 24. More precisely, radially inner ring 112 is in contact with radially outer wall 85 of sleeve 80, and radially outer ring 114 is in contact with radially inner wall 36 of housing 24.

Radially inner ring 112 of each bearing 100, 102 is arranged axially facing one of faces 93, 94 of shoulder 92 of sleeve 80. Radially outer ring 114 of each bearing 100, 102 is arranged axially facing one of faces 42, 44 of shoulder 40 of housing 24.

As can be seen in FIGS. 2 and 3, first and second bearings 100, 102 are arranged each on an opposite side of shoulder 40 of housing 24 and shoulder 92 of sleeve 80. Advantageously, radially outer rings 114 of bearings 100, 102 are in contact with one of faces 42, 44 of shoulder 40. In FIGS. 2 and 3, radially outer ring 114 of first bearing 100 is in contact with face 42, while radially outer ring 114 of second bearing 102 is in contact face 44.

Radially inner ring 112 is configured to rotate with sleeve 80 about the X axis. Radially outer ring 114 is configured to be fixed. First and second bearings 100, 102 therefore allow a durable assembly of sleeve 80, movable in rotation around the X axis, in housing 24 which is fixed.

First and second bearings 100, 102 are for example angular contact bearings.

First preloading element 108 and second preloading element 110 have a substantially annular shape comprising a radially inner periphery 115 and a radially outer periphery 116.

Radially inner periphery 115 of each preloading element 108, 110 is arranged facing radially outer wall 85 of sleeve 80, a radial clearance 118 existing between each preloading element 108 and sleeve 80.

Radially outer periphery 116 of each preloading element 108, 110 is arranged facing radially inner wall 36 of housing 24. In particular, as indicated above, first preloading element 108 is connected to first tapping 47, while second preloading element 110 is connected to second tapping 48. For this purpose, radially outer periphery 116 of each preloading element comprises a thread 119, 120 respectively complementary to tapping 47, 48. Because preloading elements 108, 110 are screwed to housing 24, they can be moved axially towards or away from the respective elastic members 104, 106, in order to adjust the preloading stress in each of these elastic members 104, 106.

In order to block axial movement of preloading elements 108, 110 respectively towards elastic members 104, 105, each preloading element 108, 110 may comprise an axial stop (not shown) complementary to the axial stops that wall 36 of the housing may comprise.

First elastic member 104 is arranged in cavity 99 between first bearing 100 and first preloading element 108. Second elastic member 106 is arranged in cavity 99 between second bearing 102 and second preloading element 110.

First and second elastic members 104, 106 are for example elastic washers. Washers 104, 106 each comprise a radially inner periphery 121 arranged facing radially outer wall 85 of sleeve 80, and a radially outer periphery 122 arranged facing radially inner wall 36 of housing 24.

Advantageously, washers 104, 106 have a substantially frustoconical shape. As can be seen in FIGS. 2 and 3, radially inner periphery 121 of washers 104, 106 bears respectively against first preloading element 108 and second preloading element 110. This makes it possible to adjust the preloading stress in each of washers 104, 106, by axial movement of the respective preloading elements 108, 110.

Radially outer periphery 122 of washers 104, 106 comes to bear respectively against the outer ring of first bearing 100 and the outer ring of second bearing 102.

The preloading stress of first washer 104 prevents washer 104 from deforming when device 22 is subjected to an axial force that is less than or equal to a first threshold. When the axial force to which device 22 is subjected is greater than the first threshold, washer 104 is compressed axially. Similarly, the preloading stress of second washer 106 prevents washer 106 from deforming when device 22 is subjected to an axial force that is less than or equal to a second threshold. When the axial force to which device 22 is subjected is greater than the second threshold, washer 106 is compressed axially.

Kinematically, device 22 comprises a first assembly 200 and a second assembly 300. First assembly 200 comprises the components of device 22 which are movable in rotation about the X axis. Thus, for device 22 of FIGS. 2 and 3, first assembly 200 comprises nut 26, sleeve 80, and closing nut 96. Second assembly 300 comprises the components of the device which are fixed. In the case of device 22 of FIGS. 2 and 3, second assembly 300 comprises housing 24, preloading elements 108, 110, and elastic members 104, 106.

First and second assemblies 200, 300 are advantageously coaxial.

As indicated above, the diameter of flange 60 of nut 26 is greater than the diameter of bore 38 of housing 24, which allows flange 60 and end 30 of housing 24 to be partially facing one another axially. A first axial clearance 201 is thus formed between a portion 123 of face 62 of flange 60 and a portion 125 of first end 30 of housing 24. As will be explained below, portion 123 of face 62 constitutes an axial stop 123, while portion 125 of end 30 of housing 24 constitutes a complementary axial stop 125. Preferably, the axial length of the first clearance is less than or equal to the value of the axial compression undergone by second elastic member 106 when the axial force to which device 22 is subjected is greater than the second threshold.

As indicated above, the diameter of closing face 101 is greater than the diameter of bore 38 of housing 24, which allows closing face 101 and end 32 of housing 24 to be partially facing one another axially. A second axial clearance 301 is thus formed between a portion 127 of closing face 101 of closing nut 96 and a portion 129 of second end 32 of housing 24. As will be explained below, portion 127 of closing face 101 constitutes an axial stop 127, while portion 129 of end 32 of housing 24 constitutes a complementary axial stop 129. Preferably, an axial length of the second clearance is less than or equal to a value of the axial compression undergone by first elastic member 104 when the axial force to which device 22 is subjected is greater than the first threshold.

An operation of device 22 according to the embodiment of FIGS. 2 and 3 will now be described.

Under normal service conditions, meaning when device 22 is not subjected to axial forces greater than the first or second thresholds, first assembly 200 is movable in rotation around the X axis relative to second assembly 300. In particular, actuator 20 rotates first assembly 200 around the X axis, while second assembly 300 remains unmoving. The rotation of first assembly 200 causes translational movement of screw 28 in the X direction, as explained above. This will cause the movable part of the seat to move relative to its fixed part.

Advantageously, under normal operating conditions, no axial movement of first assembly 200 relative to second assembly 300 occurs. The length of axial clearances 201, 301 is therefore not modified.

As schematically represented in FIG. 2 by the dotted curve, when an axial force E1 above the first threshold is applied to screw 28 in a direction directed towards nut 26, force E1 is transmitted from screw 28 to nut 26 and to sleeve 80. This causes movement of first assembly 200 in the direction of force E1. The movement of first assembly 200 causes an integral movement of shoulder 92, which causes a transmission of axial force E1 to inner ring 112 of first bearing 100, then a movement of outer ring 114 of bearing 100 in the direction of force E1. Outer ring 114 then causes a deformation, in particular an axial compression, of first elastic member 104. Force E1 is then transmitted to first preloading element 108 to ultimately be dissipated through housing 24.

As indicated above, the length of clearance 301 is less than or equal to the value of the axial compression undergone by elastic member 104 in the presence of an axial force having the characteristics of force E1. Therefore, the compression of elastic member 104 causes the length of clearance 301 to be reduced until axial stop 127 of first assembly 200 comes to bear against complementary axial stop 129 of second assembly 300. On the one hand, this blocks axial movement of first assembly 200 relative to second assembly 300. On the other hand, rotation of first assembly 200 about the X axis is braked because of the friction existing between axial stop 127 and complementary axial stop 129.

The dotted curve in FIG. 3 schematically represents the path of the forces in device 22 when an axial force E2 above the second threshold is applied to screw 28 in a direction directed towards closing nut 96. In this case, force E2 is transmitted from screw 28 to nut 26 and to sleeve 80. This causes a movement of first assembly 200 in the direction of force E2. The movement of first assembly 200 causes an integral movement of shoulder 92, which causes a transmission of axial force E2 to inner ring 112 of second bearing 102, then a movement of outer ring 114 of bearing 102 in the direction of force E2. Outer ring 114 then causes a deformation, in particular an axial compression, of second elastic member 106. Force E2 is then transmitted to second preloading element 110 to ultimately be dissipated through housing 24.

As indicated above, the length of clearance 201 is less than or equal to the value of the axial compression undergone by elastic member 106 in the presence of an axial force having the characteristics of force E2. Therefore, the compression of elastic member 104 causes the reduction in the length of clearance 201 until axial stop 123 of first assembly 200 comes to bear against complementary axial stop 125 of second assembly 300. On the one hand, this blocks the axial movement of first assembly 200 relative to second assembly 300. On the other hand, rotation of first assembly 200 about the X axis is braked because of the friction existing between axial stop 123 and complementary axial stop 125.

Figure 4:
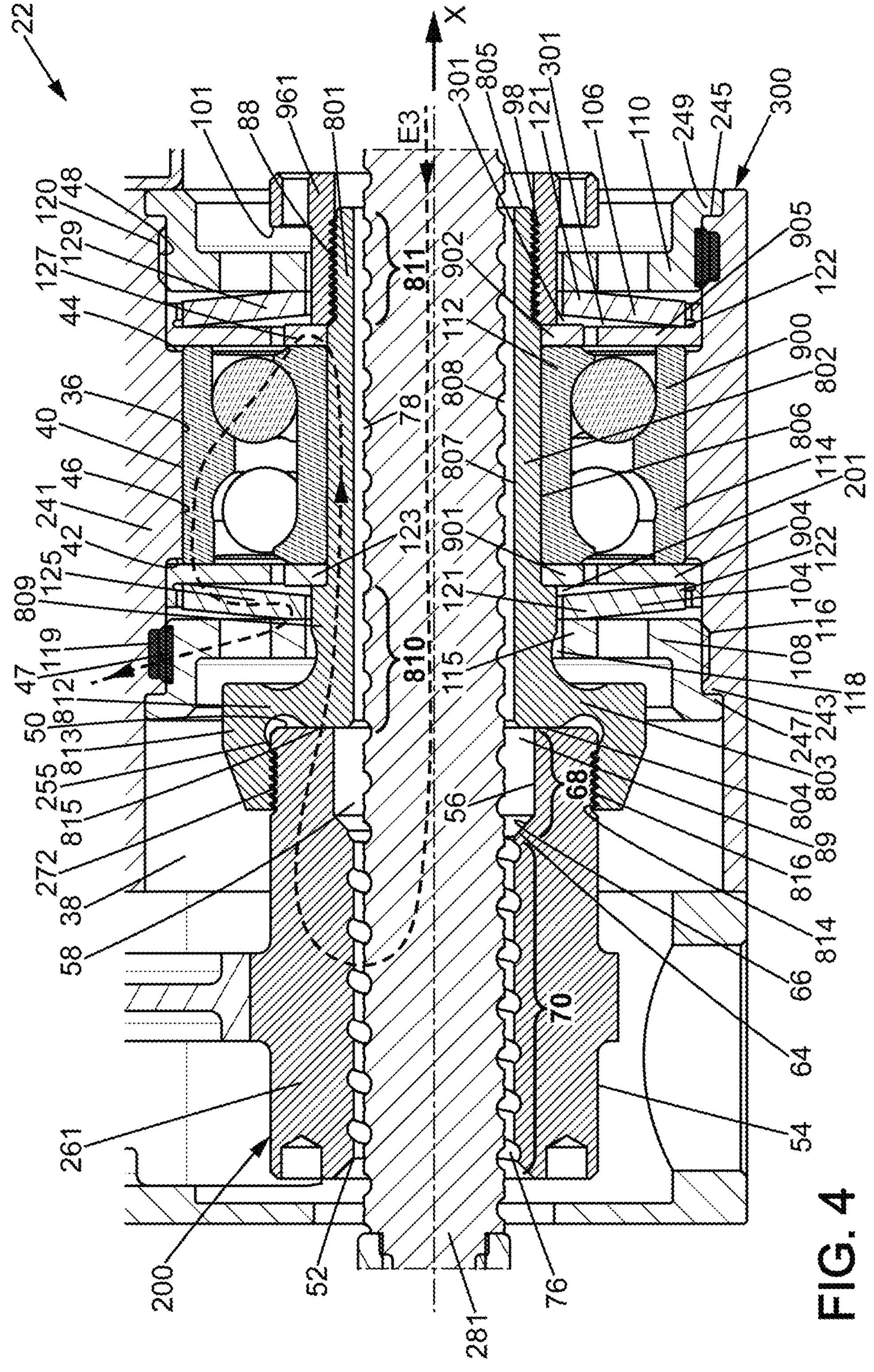
FIG. 4 shows a schematic view in axial section of the transmission device for transmitting a movement generated by the seat actuator of FIG. 1 according to another embodiment, and a force path followed by this transmission device when an axial force is applied in a first direction to the transmission device.
Figure 5:
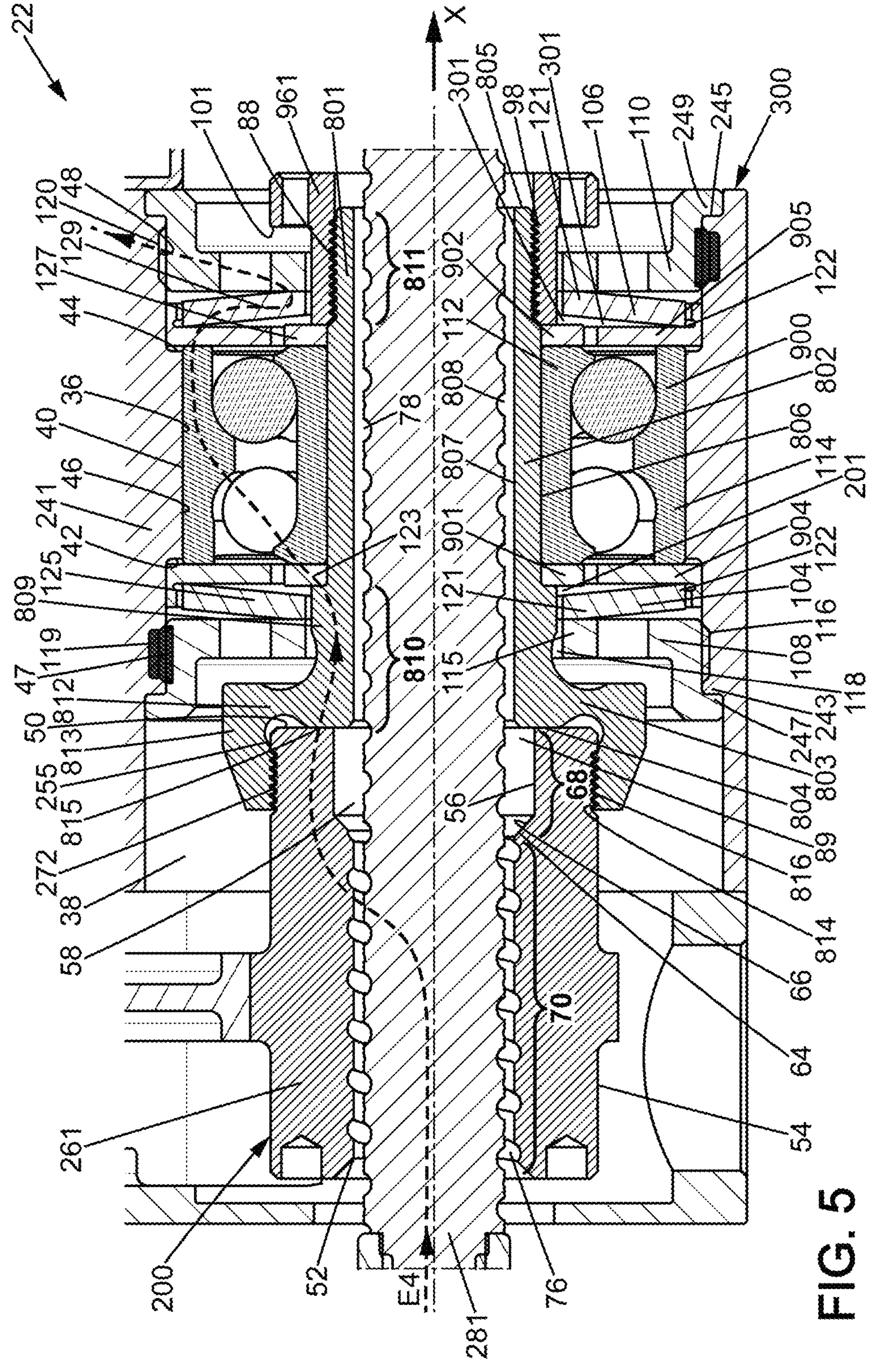
FIG. 5 shows the same view of the transmission device for transmitting a movement of FIG. 4, and a force path followed by this transmission device when an axial force in a second direction opposite to the first direction is applied to the transmission device.

FIGS. 4 and 5 show a second embodiment of device 22. Unless otherwise indicated, in the following, the components which bear the same references as in FIGS. 2 and 3 are similar or identical to those which have been described above and will not be described again.

In this embodiment, device 22 comprises a housing 241, a nut 261, and a screw 281.

Housing 241 and screw 281 are respectively similar to housing 24 and screw 28 described above with reference to FIGS. 2 and 3. Consequently, they will not be described again. However, it should be noted that in FIGS. 4 and 5, the first and second stops which block axial movement of preloading elements 108, 110 are shown. The first stop is denoted 243, while the second stop is denoted 245. In these figures, the complementary stops provided on preloading elements 108, 110 are also visible. The complementary stop for stop 243 is denoted 247, and the complementary stop for stop 245 is denoted 249.

Nut 261 differs from nut 26 in that radially outer wall 54 does not comprise an annular flange 60. A thread 272 is provided on radially outer wall 54. Thread 272 is for example annular. Thread 272 is comprised on an end portion 255 of radially outer wall 54 which comprises first end 50.

As it is clear from FIGS. 4 and 5, in nut 261, the first zone 68 of radially inner wall 56 does not comprise a tapping 72.

Device 22 further comprises a sleeve 801 integral to a closing nut 961.

Closing nut 961 is similar to closing nut 96 of FIGS. 2 and 3. However, it should be noted that in closing nut 961, closing face 101 has a smaller diameter than the diameter of bore 38 through housing 241. Closing nut 961 may therefore be placed inside housing 241.

Sleeve 801 comprises a cylindrical envelope 802 and a crown 803.

Cylindrical envelope 802 extends between a first end 804 and a second end 805 and comprises a radially outer wall 806 and a radially inner wall 807. Radially inner wall 807 defines a bore 808 which traverses cylindrical envelope 802 axially between first end 804 and second end 805. Bore 808 is similar to bore 107 of sleeve 80 of device 22 of FIGS. 2 and 3 and will not be described again here.

Radially outer wall 806 of cylindrical envelope 802 comprises a radial projection 809 on an end portion 810 comprising first end 804.

Radially outer wall 806 of cylindrical envelope 802 comprises, on an end portion 811 comprising second end 805, thread 88 described above with reference to FIGS. 2 and 3. Thread 88 is complementary to tapping 98 of closing nut 961.

Crown 803 comprises a radial portion 812 and an axial portion 813. Radial portion 812 extends radially outwards from sleeve 801, between first end 804 of cylindrical envelope 802 and axial portion 813. The diameter of radial portion 812 is therefore greater than the diameter of bore 808.

Axial portion 813 extends axially between an end integral to radial portion 812 and a free end.

An axially inner wall 814 of radial portion 812 and a radially inner wall 815 of axial portion 813 define an accommodation for assembling with nut 261. In particular, radially inner wall 815 of axial portion 813 comprises a tapping 816 complementary to thread 272 of radially outer wall 54 of nut 261.

In the embodiment of FIGS. 4 and 5, a single bearing 900 is provided in device 22. Bearing 900 comprises a radially inner ring 112 and a radially outer ring 114, such as those detailed with reference to FIGS. 2 and 3. Preferably, bearing 900 is a double-row bearing.

Bearing 900 is arranged on shoulder 40 of housing 241.

A first annular spacer 901 and a second annular spacer 902 are connected to cylindrical envelope 802. In particular, spacers 901, 902 project radially from cylindrical envelope 802.

First spacer 901 is in contact with radial projection 809 from cylindrical envelope 802. Second spacer 902 is in contact with closing nut 907.

Advantageously, spacers 901, 902 are arranged axially one on either side of radially inner ring 112 of bearing 900. This makes it possible to hold bearing 900 in position.

Because spacers 901 and 902 are connected to the cylindrical envelope, they move integrally with sleeve 801.

A first support plate 904 and a second support plate 905 are arranged one on either side of shoulder 42 of housing 241. Support plates 904, 905 are therefore arranged one on either side of bearing 900. Advantageously, when no axial force greater than the first threshold described above is acting on device 22, support plate 904 is radially face to face with spacer 901. In a similar manner, when no axial force greater than the second threshold described above is acting on device 22, support plate 905 is radially face to face with spacer 902.

Support plates 904, 905 are interposed between washers 104, 106 and radially outer ring 114 of bearing 900. Thus, in this embodiment, radially outer periphery 122 of washers 104, 106 comes to bear axially against support plate 904 and support plate 905 respectively. However, washers 104, 106 are indirectly (through support plates 904, 905) bearing axially against radially outer ring 814 of the bearing.

Support plates 904, 905 are for example annular. An axial half-section of plates 904, 905 advantageously has an inverted L shape. This inverted L shape makes it possible to keep support plates 904, 905 in position by their being wedged between bearing 900 and radially outer periphery 122 of washer 104 and washer 106 respectively. It is therefore unnecessary to fix plates 904, 905 to any component of device 22. Thus, support plate 904 is moved axially when a force greater than the first threshold is applied to device 22, and support plate 905 is moved axially when a force greater than the second threshold is applied to device 22, as will be described below.

In this embodiment, first assembly 200 comprises nut 261, sleeve 801, closing nut 907, and spacers 901, 902. Second assembly 300 comprises housing 241, preloading elements 108, 110, and elastic members 104, 106. Furthermore, first axial clearance 201 exists between first spacer 901 and first elastic member 104, while second axial clearance 301 exists between second spacer 902 and second elastic member 106.

An operation of device 22 according to the embodiment of FIGS. 4 and 5 will now be described.

Under normal operating conditions, the operation of device 22 of FIGS. 4 and 5 is identical to that of FIGS. 2 and 3.

As schematically represented in FIG. 4 by the dotted curve, when an axial force E3 greater than the first threshold is applied to screw 28 in a direction directed towards nut 261, force E3 is transmitted from screw 28 to nut 261 and to sleeve 801. This causes a movement of first assembly 200 in the direction of force E3. Spacer 902 then abuts axially against inner ring 112 of bearing 900, which causes a transmission of axial force E3 to ring 112. Force E3 is transmitted to outer ring 114 of bearing 900, which causes axial movement of ring 114 in the direction of force E3. Ring 114 then abuts axially against support plate 904 so as to drive it in axial translation in the direction of force E3. Elastic member 104 is then compressed axially. Next, force E3 is transmitted to first preloading element 108 to ultimately be dissipated through housing 241.

The compression of elastic member 104 causes the length of second axial clearance 201 to be reduced until spacer 901 comes to bear against elastic member 104. On the one hand, this blocks axial movement of first assembly 200 relative to second assembly 300. On the other hand, the rotation of first assembly 200 about the X axis is braked because of the friction existing between axial stop 127, corresponding to spacer 901, and complementary axial stop 129, corresponding to elastic member 104.

As schematically represented in FIG. 5 by the dotted curve, when an axial force E4 greater than the second threshold is applied to screw 28 in a direction directed towards closing nut 907, force E4 is transmitted from screw 28 to nut 261 and to sleeve 801. This causes a movement of first assembly 200 in the direction of force E4. Spacer 901 then abuts against inner ring 112 of bearing 900 which causes a transmission of axial force E4 to ring 112. Force E4 is transmitted to outer ring 114 of bearing 900, which causes axial movement of ring 114 in the direction of force E4. Ring 114 then abuts axially against support plate 905 so as to drive it in axial translation in the direction of force E4. Elastic member 106 is then compressed axially. Next, force E4 is transmitted to second preloading element 110 to ultimately be dissipated through housing 241.

The compression of elastic member 106 causes the length of second axial clearance 301 to be reduced until spacer 902 comes to bear against elastic member 106. On the one hand, this blocks the axial movement of first assembly 200 relative to second assembly 300. On the other hand, the rotation of first assembly 200 about the X axis is braked due to the friction existing between axial stop 173, corresponding to spacer 902, and complementary axial stop 129, corresponding to elastic member 106.

Note that in certain cases, in order for transmission device 22 to activate in the event of excess load (meaning when the axial force applied on device 22 is greater than the first or second threshold), the rotation of nut 26, 261 is blocked with sufficient torque. For this purpose, transmission device 22, and in particular nut 26, 261, may be connected to an element which allows braking the nut. For example, the nut may be connected to, among other possibilities, a friction brake or a motor with a high detent torque (also called cogging torque). According to a definition accepted by the International Electrotechnical Commission (IEC), cogging torque is “cyclic torque in an unenergized permanent magnet motor resulting from the tendency of the rotor and stator to align themselves in a position of minimum magnetic reluctance.”

The element which allows the braking of nut 26, 261 may for example be comprised in the reduction gear described above.

The invention claimed is:

1. Transmission device for transmitting a movement, the device comprising:

a screw extending along an axis;

a nut cooperating with the screw;

a housing;

a first elastic member;

a second elastic member;

a first assembly comprising said nut;

a second assembly comprising said housing;

a first axial stop which is axially integral with the first assembly and able to cooperate with a first complementary axial stop of the second assembly, a first axial clearance being formed between the first axial stop and the first complementary axial stop; and a second axial stop which is axially integral with the first assembly and able to cooperate with a second complementary axial stop of the second assembly, a second axial clearance being formed between the second axial stop and the second complementary axial stop;

the first elastic member being able to be deformed independently of the second elastic member under the effect of a first axial force oriented in a first direction and applied by the first assembly on the first elastic member, so as to reduce the first axial clearance, the first axial stop being able to come to bear against the first complementary axial stop when said first axial force exceeds a first threshold, the second elastic member being able to be deformed independently of the first elastic member under the effect of a second axial force oriented in a second direction opposite to the first direction and applied by the first assembly on the second elastic member, so as to reduce the second axial clearance, the second axial stop being able to come to bear against the second complementary axial stop when said second axial force exceeds a second threshold.

2. The transmission device according to claim 1, further comprising a first preloading element and a second preloading element, the first preloading element being able to adjust a preloading stress acting on the first elastic member independently of a preloading stress acting on the second elastic member, the second preloading element being able to adjust the preloading stress acting on the second elastic member independently of the preloading stress acting on the first elastic member.

3. The transmission device according to claim 2, comprising at least one bearing which comprises a radially inner ring arranged facing the first assembly and a radially outer ring arranged facing the second assembly, a radially outer periphery of each elastic member coming to bear axially, directly or indirectly, against the radially outer ring of said bearing, and a radially inner periphery coming to bear axially against the preloading element.

4. The transmission device according to claim 3, wherein the second assembly comprises a shoulder extending radially from a radially inner wall of the housing, wherein the first elastic member is arranged on a first side of the shoulder of the second assembly and the second elastic member is arranged on a second side of the shoulder of the second assembly that is opposite to the first side.

5. The transmission device according to claim 4, wherein a first bearing is arranged between the first elastic member and the first side of the shoulder of the second assembly, and wherein a second bearing is arranged between the second elastic member and the second side of the shoulder of the second assembly, wherein the radially outer periphery of the first elastic member comes to bear axially against the radially outer ring of the first bearing and the radially outer periphery of the second elastic member comes to bear axially against the radially outer ring of the second bearing.

6. The transmission device according to claim 5, further comprising a first annular support plate arranged between the radially outer ring of a bearing and the radially outer periphery of the first elastic member, and a second annular support plate arranged between the radially outer ring of the bearing and the radially outer periphery of the second elastic member, the radially outer periphery of the first elastic member coming to bear against the first support plate and the radially outer periphery of the second elastic member coming to bear against the second support plate.

7. The transmission device according to claim 5, wherein the first assembly comprises a shoulder extending radially from a radially outer wall of the first assembly, the shoulder of the first assembly being arranged radially facing the shoulder of the second assembly.

8. The transmission device according to claim 4, wherein the first assembly comprises a shoulder extending radially from a radially outer wall of the first assembly, the shoulder of the first assembly being arranged radially facing the shoulder of the second assembly.

9. The transmission device according to claim 8, wherein the shoulder of the first assembly has a length in the axial direction that is shorter than the length in said axial direction of the shoulder of the second assembly.

10. The transmission device according to claim 4, wherein a bearing is arranged radially inside the shoulder of the second assembly.

11. The transmission device according to claim 4, wherein a first bearing is arranged between the first elastic member and the first side of the shoulder of the second assembly, and wherein a second bearing is arranged between the second elastic member and the second side of the shoulder of the second assembly, wherein the radially outer periphery of the first elastic member comes to bear axially against the radially outer ring of the first bearing and the radially outer periphery of the second elastic member comes to bear axially against the radially outer ring of the second bearing, wherein a bearing is arranged radially inside the shoulder of the second assembly, the transmission device further comprising a first annular support plate arranged between the radially outer ring of the bearing and the radially outer periphery of the first elastic member, and a second annular support plate arranged between the radially outer ring of the bearing and the radially outer periphery of the second elastic member, the radially outer periphery of the first elastic member coming to bear against the first support plate and the radially outer periphery of the second elastic member coming to bear against the second support plate.

12. Seat for an aircraft, comprising a fixed part intended to be fixed to a complementary fixed part of the aircraft and a movable part able to be moved relative to the fixed part, a transmission device for transmitting a movement according to claim 1 being mounted between the movable part and the fixed part, the nut of the transmission device being able to be rotated by an actuator, the screw being connected to said movable part of the seat, the housing being connected to said fixed part of the seat.

* * * * *